Figure 3:
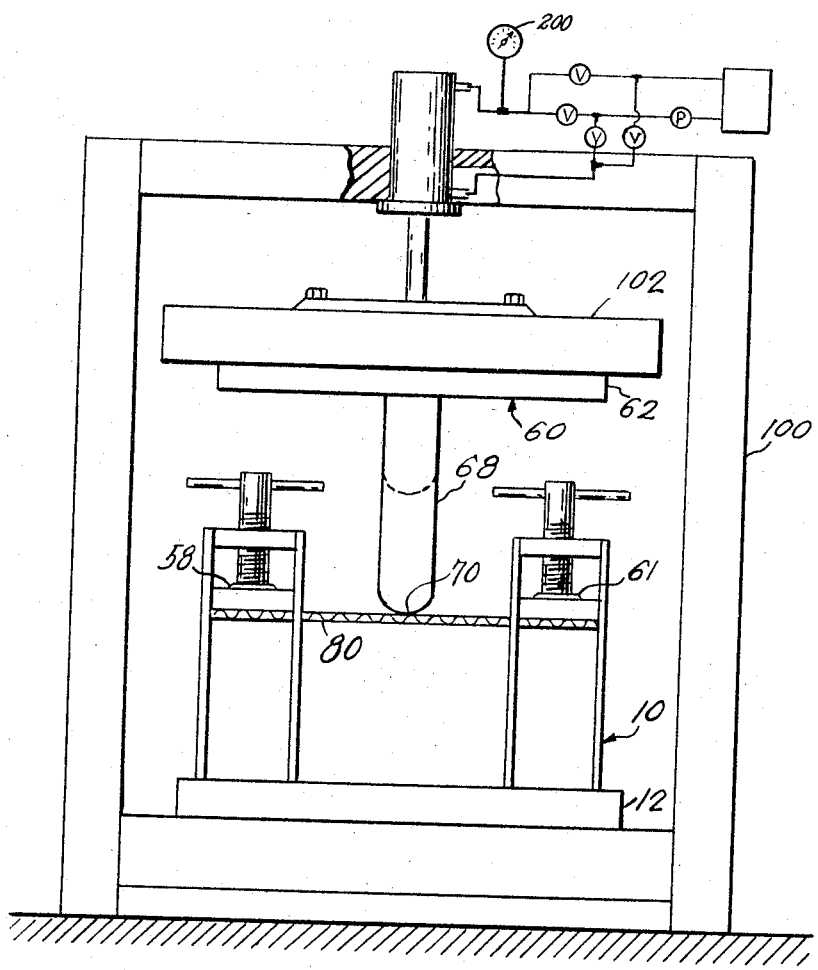

May 16, 1967  H. J. OSTROWSKI  3,319,462
TEAR TESTER
Filed July 10, 1964  2 Sheets-Sheet 1
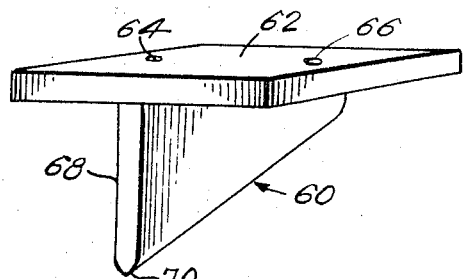
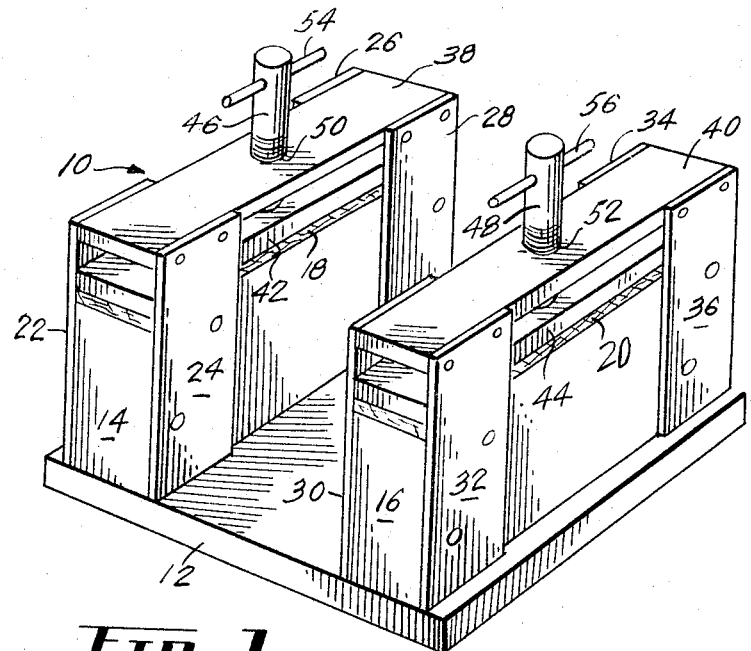
INVENTOR
Henry J. OSTROWSKI
AGENT

United States Patent Office 3,319,462
Patented May 16, 1967

3,319,462
TEAR TESTER
Henry J. Ostrowski, Port Credit, Ontario, Canada, assignor to Domtar Limited, Montreal, Quebec, Canada, a company of Canada
Filed July 10, 1964, Ser. No. 381,816
5 Claims. (Cl. 73—96)

The present invention relates to testing of materials. More specifically, to the testing of combined corrugated boards, combined paper boards and laminates or the like to obtain an indication of the force required for initial tearing and, if desired, the force required to propagate this tear.

Currently, there are no techniques or instruments available for determining the initial and/or the propagating tear strength of combined or heavier density board. Known testing systems used either the pendulum device; or a torsion device on pre-slit samples to obtain the force required to propagate the tear; or a pointed instrument which is dropped on to a sample and the degree of penetration measured to obtain an indication of the tear strength of the paper. These prior art techniques and devices are suitable for testing fine papers, newsprint, etc., but are unsuitable when testing heavier grades such as combined boards or the like. Furthermore, these prior art techniques do not give any specific indication of the initial force required to start a tear. With converted articles, in particular, it is the force required to initiate a tear that determines the point of failure of such articles.

Thus, it is an object of this invention to provide a system of testing that will register the force required to initiate a tear.

It is a further object to provide a system of testing wherein the force required to initiate a tear and the force required to propagate this tear can be recorded.

A further object of the present invention is to provide an apparatus that may utilize a conventional press to obtain a measurement of tear strength.

Further features, objects and advantages will be evident from the following detailed description read in conjunction with the accompanying drawings in which FIG. 1 is a perspective view of one element of the present testing mechanism, FIG. 2 is a perspective view of the complementary element of the present invention, and FIG. 3 is a schematic end view of the present invention mounted in a press with a sample in position to be tested.

Broadly, the present invention comprises a pair of spaced clamping means to hold the ends of a sample and a pressure-applying member having a sloped sample engaging surface. The sample engaging surface of the pressure-applying member is pressed against the sample between the spaced clamping means and the force required to tear the sample is recorded.

In FIG. 1, the clamping device 10 is illustrated. This clamping device 10 includes a base 12 with a pair of spaced upstanding pillars 14 and 16. Each of the pillars 14 and 16 is provided with a knurled upper surface 18 and 20 respectively. These surfaces 18 and 20 each form one surface of a pair of clamping means to hold a sample to be tested.

Spaced above the pillars 14 and 16 are beams 38 and 40 respectively. These beams 38 and 40 are suspended above the pillars 14 and 16 by upstanding plates 22, 24, 26, 28, 30, 32, 34 and 36. These plates are secured to the beam members 38 and 40 and the respective pillars 14 and 16 by any suitable means, such as bolts or the like.

A pair of gripping jaws 42 and 44 are freely positioned between the top surface of the pillars 14 and 16 and their respective beams 38 and 40. These gripping jaws 42 and 44 are free to slide vertically between the plates 22, 24, 26, 28, 30, 32, 34 and 36. Suitable means such as bolts 46 and 48 are provided for moving the gripping jaws 42 and 44 into clamping relationship with the surfaces 18 and 20. These bolts 46 and 48 are threaded through mating holes 50 and 52 in the beams 38 and 40 and are mounted in suitable bearings 58 and 61 in the jaws 42 and 44 respectively (see FIG. 3). Each of the bolts 46 and 48 may be provided with suitable lever pins 54 and 56 to facilitate clamping.

A pressure-applying member 60, having a base 62 and provided with a pair of mounting holes 64 and 66 for securing same in a press, is illustrated in FIG. 2. Extending downwardly from the base 62, is a keel-like blade 68. This blade 68 extends the full length of the base 62 and projects further from the base at one end than at the other. Thus, the edge 70 of the blade 68 extends on the straight line at an angle to the base, preferably at an angle of about 30°. The edge 70 is dull and is preferably shaped as a semi-circle so there are no sharp edges to cut the sample. The thickness of the blade should be in the order of about ½ inch, also to prevent the blade from cutting the sample to be tested.

To standardize results of various tests, the spacing between the columns 14 and 16 and thus, the space between the clamps, the thickness of the blade 68 and the shape of the edge 70 will of course, be made standard. Also, the size of the sample tested will be consistent.

In testing, a sized sample 80 is cut and inserted between the jaws 42 and 44 and the surfaces 18 and 20 respectively. It is preferred not to bend the sample when mounting same in the tester. Thus, the samples may be loaded by passing same between the jaw and surface of one pillar, across the space between the two pillars 14 and 16 and between the jaw and surface of the other pillar. With the sample thus positioned, the bolts 46 and 48 are tightened to firmly clamp the sample in position.

The clamping device with the sample held therein, is then inserted into a press such as that illustrated at 100 in FIG. 3. The pressure applying member 60 is secured to the top platen 102 of this press, so that the blade 68 extends downwardly therefrom. The clamp and sample are arranged so that the blade 68 extends longitudinally of the sample and the edge 70 is positioned to initially engage the front edge of the sample. In other words, the blade 68 is located with a portion thereof overlapping the leading or front transverse edge of the sample. Preferably, the sample is shorter than the blade 68 so that the blade extends the full length of the sample and overlaps the edges of same. Pressure is applied against the sample 80 by the edge 70 and the forces required to initiate and, if desired, to propagate a tear in the sample are recorded by a suitable recording mechanism such as that illustrated at 200 in FIG. 3. These forces give a very good indication of the resistance that the converted article will afford when subject to sufficient internal or external forces to damage the converted article by tearing.

Having described the present invention, it will be evident that variations may be made to the method and apparatus disclosed without departing from the spirit of the invention as defined in the appended claims.

I claim:

1. An apparatus for testing sheet material comprising; a pair of spaced clamping means to grip and hold a sample with one surface of said sample extending in a plane between said pair of spaced clamping means, one edge of said sample defining a line between said spaced clamping means, a blade substantially perpendicular to said plane, a blunt leading edge on said blade facing said plane and adapted to tear said sample, said blunt edge extending across said line and away from said sample at an acute angle to said plane, means for relatively moving said blade and said pair of clamping means in a direction substantially perpendicular to said plane, whereby said blunt edge first engages said sample at said one edge, initiates a tear and propagates said tear in said sample, and means to record the force required to initiate and propagate said tear.

2. An apparatus as defined in claim 1 wherein said acute angle is about 60°.

3. An apparatus as defined in claim 1 wherein said blade extends substantially perpendicular to said line.

4. An apparatus as defined in claim 1 wherein said clamping means each extend substantially perpendicular to said line.

5. An apparatus as defined in claim 1 wherein said blade and said pair of clamping means extend substantially perpendicular to said line.

References Cited by the Examiner

UNITED STATES PATENTS

| | | | |
|---|---|---|---|
| 1,496,838 | 6/1924 | Batcheller | 73—102 |
| 1,878,193 | 9/1932 | Scott | 73—102 |
| 2,338,338 | 1/1944 | Kieckhefer | 73—102 |
| 2,930,229 | 3/1960 | Sobota | 73—103 |
| 3,039,299 | 6/1962 | Roof | 73—102 |

RICHARD C. QUEISSER, *Primary Examiner.*

J. H. WILLIAMSON, *Assistant Examiner.*